United States Patent
Okumura

(10) Patent No.: US 9,704,219 B2
(45) Date of Patent: Jul. 11, 2017

(54) IMAGE PROCESSING APPARATUS WITH IMPROVED IMAGE REDUCTION PROCESSING

(71) Applicant: KYOCERA Document Solutions Inc.

(72) Inventor: Ryuichi Okumura, Osaka (JP)

(73) Assignee: Kyocera Document Solutions, Inc. (JP)

( * ) Notice: Subject to any disclaimer, the term of this patent is extended or adjusted under 35 U.S.C. 154(b) by 520 days.

(21) Appl. No.: 14/278,317

(22) Filed: May 15, 2014

(65) Prior Publication Data

US 2014/0347398 A1 Nov. 27, 2014

(30) Foreign Application Priority Data

May 24, 2013 (JP) ................................. 2013-110418

(51) Int. Cl.
  *G06T 3/40* (2006.01)
  *H04N 1/403* (2006.01)
(52) U.S. Cl.
  CPC ........... *G06T 3/4092* (2013.01); *H04N 1/403* (2013.01)
(58) Field of Classification Search
  CPC combination set(s) only.
  See application file for complete search history.

(56) References Cited

U.S. PATENT DOCUMENTS

| 6,134,355 | A | 10/2000 | Yamada | |
|---|---|---|---|---|
| 2001/0035975 | A1 | 11/2001 | Ishii | |
| 2006/0152765 | A1 | 7/2006 | Adachi | |
| 2007/0081733 | A1 | 4/2007 | Matsuhira | |
| 2013/0182002 | A1* | 7/2013 | Macciola | H04N 1/387 345/589 |
| 2015/0269462 | A1* | 9/2015 | Yoshizawa | G06K 15/1881 358/3.01 |
| 2016/0171333 | A1* | 6/2016 | Bui | G06T 7/0097 345/173 |

FOREIGN PATENT DOCUMENTS

JP 2005-114825 4/2005

* cited by examiner

*Primary Examiner* — Michael J Cobb

(57) ABSTRACT

An image reducing unit performs a reduction process for each reduction target area in one of a primary scanning direction and a secondary scanning direction, and subsequently performs a reduction process for each reduction target area in the other of the primary scanning direction and the secondary scanning direction. A binarizing unit binarizes pixel values of pixels in the reduction target area. A characteristic value identifying unit identifies a characteristic value on the basis of a pattern of the binarized pixel values and integrates the characteristic value. When the integrated value of the characteristic value exceeds a threshold value before the image reduction unit finishes the reduction processes, a control unit terminates the reduction process, changes the reduction ratio so as to increase a size of a reduced image, and causes the image reducing unit to perform the reduction process with the changed reduction ratio again.

6 Claims, 6 Drawing Sheets

IMAGE PROCESSING APPARATUS WITH IMPROVED IMAGE REDUCTION PROCESSING

CROSS-REFERENCE TO RELATED APPLICATIONS

This application relates to and claims priority rights from Japanese Patent Application No. 2013-110418, filed on May 24, 2013, the entire disclosures of which are hereby incorporated by reference herein.

BACKGROUND

1. Field of the Present Disclosure

The present disclosure relates to an image processing apparatus, an image processing method, and a non-transitory computer readable recording medium storing an image processing program.

2. Description of the Related Art

An image processing apparatus (a) identifies connection components of black pixels in an image, (b) calculates linear densities of the connection components, (c) extracts as a reference pattern a part which has the largest linear density, (d) reduces the image with a temporal reduction ratio, and (e) finally determines a reduction ratio on the basis of the similarity between the reference patterns before and after the reduction with the temporal reduction ratio.

However, the process performed by the aforementioned image processing apparatus is complicated; and the process scans a whole area of the image, identifies the connection components and extracts the part which has the largest linear density, and consequently the process requires a long time.

SUMMARY

An image processing apparatus according to an aspect of the present disclosure includes an image reducing unit, a binarizing unit, a characteristic value identifying unit, and a control unit. The image reducing unit is configured to perform a reduction process with a reduction ratio in one of a primary scanning direction and a secondary scanning direction of an image for each reduction target area including a predetermined number of pixels, and subsequently perform a reduction process with a reduction ratio in the other of the primary scanning direction and the secondary scanning direction of the image for each reduction target area including a predetermined number of pixels. The binarizing unit is configured to binarize pixel values of the pixels included in the reduction target area in the reduction process. The characteristic value identifying unit is configured to identify a characteristic value on the basis of a pattern of the binarized pixel values in the reduction target area, and integrate the characteristic value. The control unit is configured to terminate the reduction process of the image performed by the image reducing unit, change the reduction ratio so as to increase a size of a reduced image, and cause the image reducing unit to perform the reduction process with the changed reduction ratio again when the integrated value of the characteristic value exceeds a predetermined threshold value before the image reduction unit finishes the reduction processes in the primary scanning direction and the secondary scanning direction of the image.

An image processing method according to an aspect of the present disclosure includes the steps of: performing a reduction process with a reduction ratio in one of a primary scanning direction and a secondary scanning direction of an image for each reduction target area including a predetermined number of pixels, and subsequently performing a reduction process with a reduction ratio in the other of the primary scanning direction and the secondary scanning direction of the image for each reduction target area including a predetermined number of pixels; binarizing pixel values of the pixels included in the reduction target area in the reduction process; identifying a characteristic value on the basis of a pattern of the binarized pixel values in the reduction target area, and integrating the characteristic value; and terminating the reduction process of the image, changing the reduction ratio so as to increase a size of a reduced image, and performing the reduction process with the changed reduction ratio again when the integrated value of the characteristic value exceeds a predetermined threshold value before the reduction processes in the primary scanning direction and the secondary scanning direction of the image are finished.

A non-transitory computer readable recording medium according to an aspect of the present disclosure stores an image processing program. The image processing program causes a computer to act as an image reducing unit, a binarizing unit, a characteristic value identifying unit, and a control unit. The image reducing unit is configured to perform a reduction process with a reduction ratio in one of a primary scanning direction and a secondary scanning direction of an image for each reduction target area including a predetermined number of pixels, and subsequently perform a reduction process with a reduction ratio in the other of the primary scanning direction and the secondary scanning direction of the image for each reduction target area including a predetermined number of pixels. The binarizing unit is configured to binarize pixel values of the pixels included in the reduction target area in the reduction process. The characteristic value identifying unit is configured to identify a characteristic value on the basis of a pattern of the binarized pixel values in the reduction target area, and integrate the characteristic value. The control unit is configured to terminate the reduction process of the image performed by the image reducing unit, change the reduction ratio so as to increase a size of a reduced image, and cause the image reducing unit to perform the reduction process with the changed reduction ratio again when the integrated value of the characteristic value exceeds a predetermined threshold value before the image reduction unit finishes the reduction processes in the primary scanning direction and the secondary scanning direction of the image.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
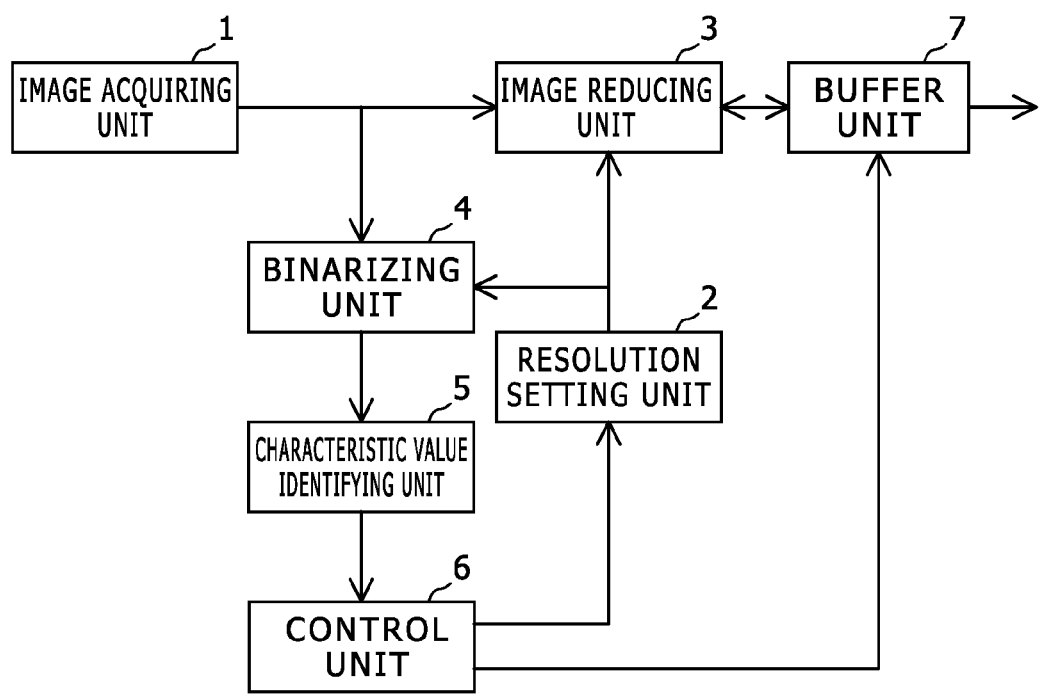
FIG. 1 shows a block diagram which indicates a configuration of an image processing apparatus according to an embodiment of the present disclosure.

FIG. 1 shows a block diagram which indicates a configuration of an image processing apparatus according to an embodiment of the present disclosure. This image processing apparatus is an image forming apparatus such as a scanner, a facsimile machine, a copier, or a multi function peripheral.

The image processing apparatus shown in FIG. 1 includes an image acquiring unit 1, a resolution setting unit 2, an image reducing unit 3, a binarizing unit 4, a characteristic value identifying unit 5, a control unit 6, and a buffer unit 7.

The image acquiring unit 1 acquires image data of an image, for example, from an image scanning unit (not shown) which optically scans a document image and generates image data of the document image.

The resolution setting unit 2 sets a resolution of a reduced image to the image reducing unit 3.

Using a reduction ratio corresponding to the resolution set by the resolution setting unit 2, the image reducing unit 3 performs a reduction process in one of a primary scanning direction and a secondary scanning direction of an image for each reduction target area including a predetermined number of pixels, and subsequently perform a reduction process in the other of the primary scanning direction and the secondary scanning direction of the image for each reduction target area including a predetermined number of pixels.

The binarizing unit 4 binarizes pixel values of the pixels included in the reduction target area in the aforementioned reduction process.

The characteristic value identifying unit 5 identifies a characteristic value on the basis of a pattern of the binarized pixel values in the reduction target area, and integrates the characteristic value.

In this embodiment, the characteristic value identifying unit 5 classifies the patterns of the binarized pixel values in the reduction target area using three or more predetermined conditions, and uses as the characteristic value one of values corresponding the three or more conditions. Here, the "three or more conditions" are the following four conditions: a first condition, a second condition, a third condition, and a fourth condition.

The characteristic value identifying unit 5 determines whether each one of the conditions is satisfied in the order of the first condition, the second condition, the third condition, and the fourth condition, and adopts as the characteristic value the value corresponding to the condition that firstly determined as a satisfied condition.

The first condition is that the number of pixels which have the binarized pixel values of 1 is zero or the number of pixels which has the binarized pixel values of 0 is zero.

The second condition is that at least one pixel which has the binarized pixel value of 1 is isolated or at least one pixel which has the binarized pixel value of 0 is isolated.

The third condition is that a binarized value of a left end pixel in the reduction target area is different from binarized values of adjacent pixels on both sides of the left end pixel or a binarized value of a right end pixel in the reduction target area is different from binarized values of adjacent pixels on both sides of the right end pixel.

The fourth condition is that none of the first condition, the second condition, and the third condition is satisfied.

In this embodiment, the value (i.e. the characteristic value) corresponding to the second condition is either equal to or larger than the value (i.e. the characteristic value) corresponding to the third condition, the value (i.e. the characteristic value) corresponding to the third condition is either equal to or larger than the value (i.e. the characteristic value) corresponding to the fourth condition, and the value (i.e. the characteristic value) corresponding to the fourth condition is either equal to or larger than the value (i.e. the characteristic value) corresponding to the first condition.

Further, in this embodiment, the both values corresponding to the second and the third conditions are larger than the value corresponding to the first condition.

For example, the value (i.e. the characteristic value) corresponding to the first condition is set as zero, the value (i.e. the characteristic value) corresponding to the fourth condition is set as 1, the value (i.e. the characteristic value) corresponding to the third condition is set as 2, and the value (i.e. the characteristic value) corresponding to the second condition is set as 3.

When the characteristic values are set in the aforementioned manner, a higher characteristic value is identified in a part with higher possibility of image quality deterioration due to the reduction, and more such parts (i.e. reduction target areas) bring a higher integrated value of the characteristic values.

When the integrated value of the characteristic value exceeds a predetermined threshold value before the image reduction unit 3 finishes the reduction processes in the primary scanning direction and the secondary scanning direction of the image, the control unit 6 terminates the reduction process of the image performed by the image reducing unit 3, changes the reduction ratio so as to increase a size of a reduced image, and causes the image reducing unit 3 to perform the reduction process with the changed reduction ratio again.

The buffer unit 7 maintains image data of the reduction target area after the reduction process performed by the image reducing unit 3, and outputs (for example, transmits through a network) the image data after the reduction process when the image reducing unit 3 finishes the reduction processes in the primary scanning direction and the secondary scanning direction.

It should be noted that for example, a computer executes an image processing program so as to act as the image acquiring unit 1, the resolution setting unit 2, the image reducing unit 3, the binarizing unit 4, the characteristic value identifying unit 5, the control unit 6, and the buffer unit 7. Such image processing program is recorded in a non-transitory computer readable recording medium.

Figure 2:
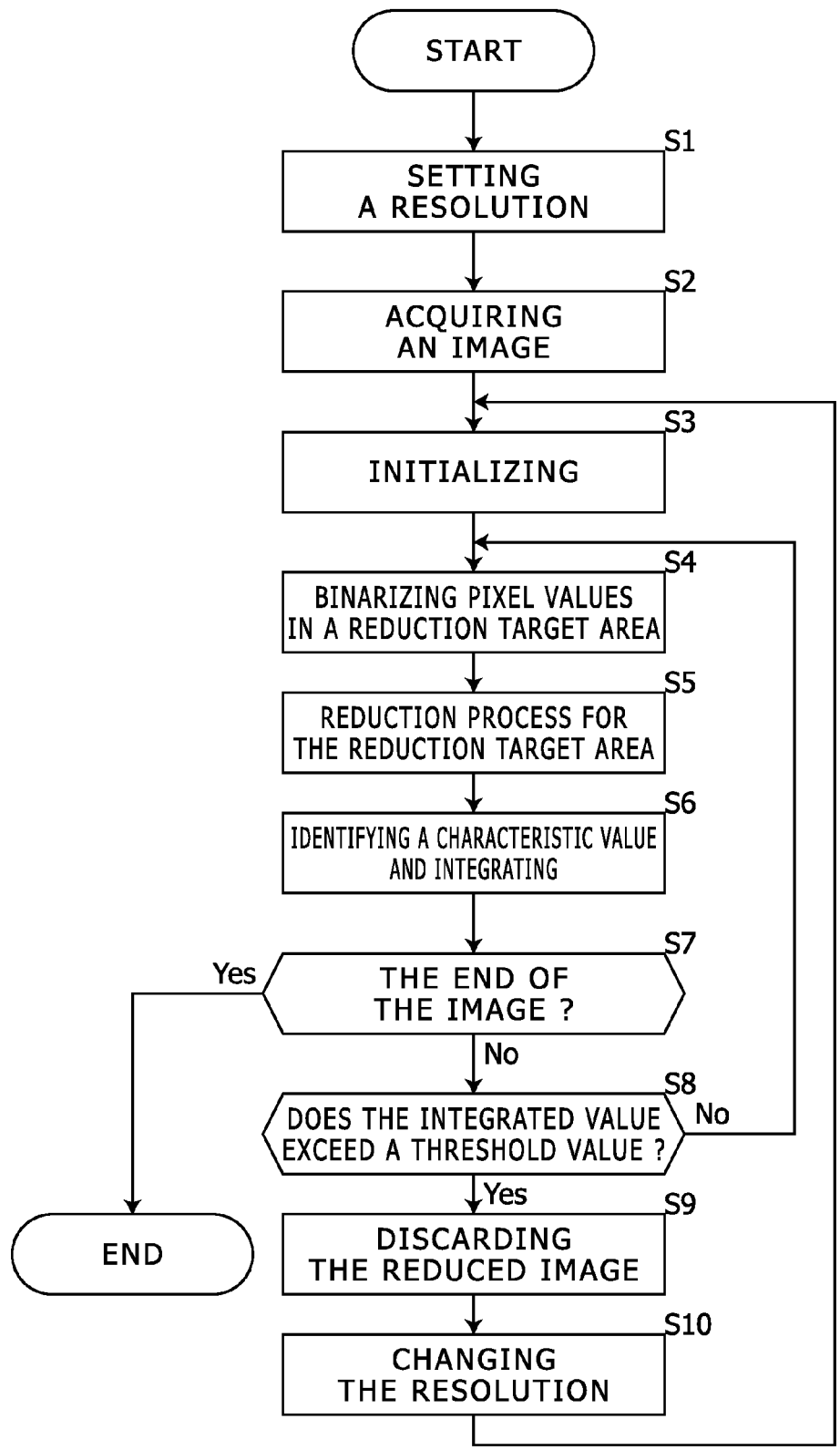
FIG. 2 shows a flowchart which explains a behavior of the image processing apparatus shown in FIG. 1.

In the following part, a behavior of the aforementioned image processing apparatus is explained. FIG. 2 shows a flowchart which explains a behavior of the image processing apparatus shown in FIG. 1.

Firstly, the resolution setting unit 2 sets initial setting values of resolutions after reduction (i.e. resolutions in the primary scanning direction and the secondary scanning direction) to the image reducing unit 3 and the binarizing unit 4 (in Step S1).

The image acquiring unit 1 acquires an image for which reduction processes are performed (in Step S2).

Further, the size (the number of pixels) of a reduction target area is determined from a current resolution of the image and the resolution after reduction; and initialized are a read address for reading out image data of a reduction target area from the image data of the image and an integrated value of the characteristic value in the characteristic value identifying unit 5 (in Step S3).

The size of a reduction target area in the primary scanning direction (i.e. the number of successive pixels in the primary scanning direction) is identified on the basis of a reduction ratio (i.e. a ratio between a resolution of an original image and a resolution of a reduced image thereof) in the primary scanning direction, and the size of a reduction target area in the secondary scanning direction (i.e. the number of successive pixels in the secondary scanning direction) is identified on the basis of a reduction ratio in the secondary scanning direction.

For example, if the resolution of the reduced image is half of the resolution of the original image, two pixels should be reduced to one pixel and therefore the size of the reduction target area is determined as two pixels.

When the image reducing unit 3 performs a reduction process in the primary scanning direction, reduction target areas are selected in turn from an image in the primary scanning direction. Specifically, reduction target areas are selected in turn in the top line of the image; after a reduction target area is selected at the end of the top line, reduction target areas are selected in turn in the next line; and after a reduction target area is selected at the end of this line, reduction target areas are selected in turn in the further next line. In this manner, until a reduction target area is selected at the end of the last line, reduction target areas are selected in turn.

The binarizing unit 4 binarizes a pixel value (e.g. 8-bit gradation value) of each pixel in the currently selected reduction target area (in Step S4).

Further, the image reducing unit 3 performs the reduction process for the currently selected reduction target area and stores image data (i.e. a reduced image corresponding to the reduction target area) generated in the reduction process to the buffer unit 7 (in Step S5). The reduction process is a process which reduces plural pixels in the reduction target area to one pixel. A pixel value of a pixel after reduction is calculated from pixel values of the plural pixels in the reduction target area (for example, as an average value of the pixel values of the plural pixels).

Further, the characteristic value identifying unit 5 identifies a characteristic value corresponding to a pattern of the binarized pixel values of plural pixel in the currently selected reduction target area, and integrates the characteristic value (in Step S6).

Subsequently, if the currently selected reduction target area is not located at the end of the image (in Step S7), then the control unit 6 determines whether the integrated value of the characteristic values exceeds a predetermined threshold value (in Step S8).

If the integrated value of the characteristic values does not exceed the predetermined threshold value, the control unit 6 selects the next reduction target area, and causes the image reduction unit 3, the binarizing unit 4, and the characteristic value identifying unit 5 to perform the processes in and after Step S4 for the selected reduction target area.

Contrarily, if the integrated value of the characteristic values exceeds the predetermined threshold value, the control unit 6 discards image data currently stored in the buffer unit 7 in the reduction process in the primary scanning direction (in Step S9); increases the resolution of a reduced image, and causes the resolution setting unit 2 to set the increased resolution (in Step S10); and causes the image reducing unit 3, the binarizing unit 4, and the characteristic value identifying unit 5 to perform processes in and after Step S3 (i.e. to perform the reduction process in the primary scanning direction again after changing the resolution).

If the integrated value of the characteristic values does not exceed the predetermined threshold value and the currently selected reduction target area is located at the end of the image (in Step S7), the control unit 6 finishes the reduction process in the primary scanning direction.

Subsequently, for the image obtained in the reduction process in the primary scanning direction, the control unit 6 performs a reduction process in the secondary scanning direction in the same manner (from Step S3).

It should be noted that when the integrated value of the characteristic values exceeds a predetermined threshold value in the middle of the reduction process in the secondary scanning direction, the resolution of an image after reduction in the secondary scanning direction may be changed and the reduction process in the secondary scanning direction may be performed again or the resolutions of an image after reduction in both the primary scanning direction and secondary scanning direction may be changed and the reduction processes in the primary scanning direction and the secondary scanning direction may be performed again.

Further, when the reduction process in the secondary scanning direction is finished, the control unit 6 outputs image data stored in the buffer unit 7 (i.e. an image reduced with appropriate reduction ratios in the primary scanning direction and the secondary scanning direction).

In the aforementioned manner, an image reduced with appropriate reduction ratios in the primary scanning direction and the secondary scanning direction is obtained and outputted.

Here identification of the characteristic value in Step S6 is explained in detail.

(a) In a case that the reduction target area consists of two pixels

Figure 3:
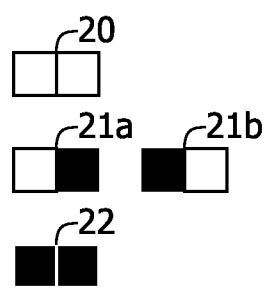
FIG. 3 shows a diagram which indicates patterns of binarized pixel values in a case that a reduction target area consists of two pixels.

FIG. 3 shows a diagram which indicates patterns of binarized pixel values in a case that a reduction target area consists of two pixels.

If the reduction target area consists of two pixels, a binarized pixel value pattern of the reduction target area falls under any one of pixel value patterns 20, 21*a*, 21*b* and 22 shown in FIG. 3. It should be noted that in the figure, the black pixel indicates a pixel having a pixel value of 1 and the white pixel indicates a pixel having a pixel value of 0.

Among them, the pixel value patterns 20 and 22 satisfy the first condition, and the pixel value patterns 21*a* and 21*b* have the possibility of satisfying the third condition.

If a binarized pixel value pattern of the currently selected reduction target area falls under the pixel value pattern 21*a* or 21*b*, then on the basis of binarized pixel values of adjacent pixels it is determined whether or not the third condition is satisfied on the currently selected reduction target area. Here it may be applicable that the fourth condition is automatically satisfied when the third condition is not satisfied.

(b) In a case that the reduction target area consists of three pixels

Figure 4:
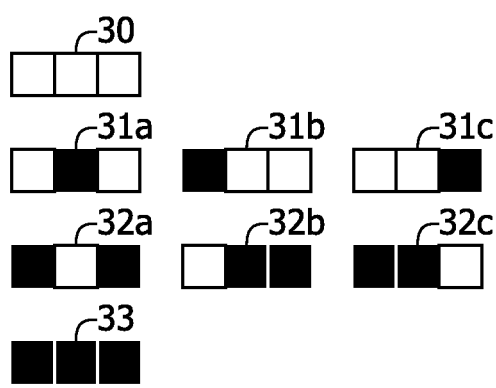
FIG. 4 shows a diagram which indicates patterns of binarized pixel values in a case that a reduction target area consists of three pixels.

FIG. 4 shows a diagram which indicates patterns of binarized pixel values in a case that a reduction target area consists of three pixels.

If the reduction target area consists of three pixels, a binarized pixel value pattern of the reduction target area falls under any one of pixel value patterns 30, 31a to 31c, 32a to 32c and 33 shown in FIG. 4.

Among them, the pixel value patterns 30 and 33 satisfy the first condition, the pixel value patterns 31a and 32a satisfy the second condition, and the pixel value patterns 31b, 31c, 32b and 32c have the possibility of satisfying the third condition.

If a binarized pixel value pattern of the currently selected reduction target area falls under the pixel value pattern 31b, 31c, 32b or 32c, then on the basis of binarized pixel values of adjacent pixels it is determined whether or not the third condition is satisfied on the currently selected reduction target area. Here it may be applicable that the fourth condition is automatically satisfied when the third condition is not satisfied.

(c) In a case that the reduction target area consists of four pixels

Figure 5:
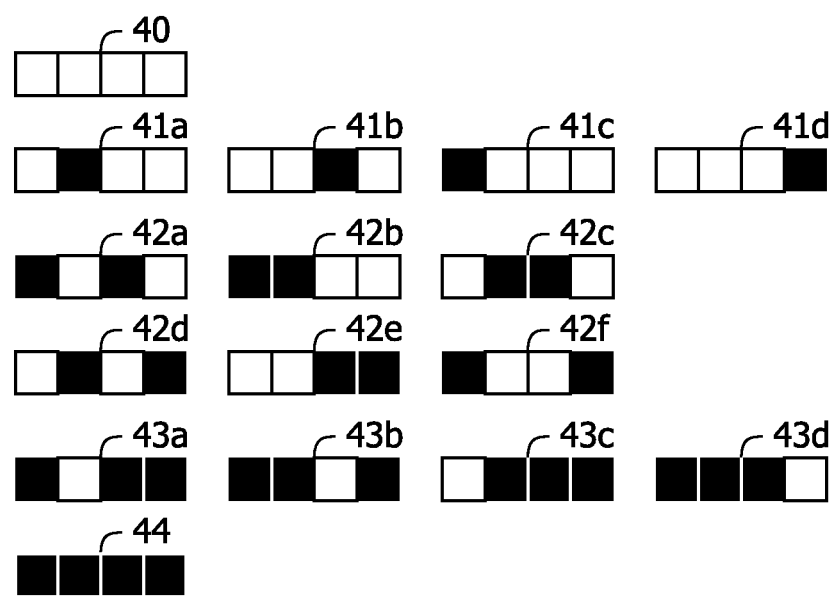
FIG. 5 shows a diagram which indicates patterns of binarized pixel values in a case that a reduction target area consists of four pixels.

FIG. 5 shows a diagram which indicates patterns of binarized pixel values in a case that a reduction target area consists of four pixels.

If the reduction target area consists of four pixels, a binarized pixel value pattern of the reduction target area falls under any one of pixel value patterns 40, 41a to 41d, 42a to 42f, 43a to 43d and 44 shown in FIG. 5.

Among them, the pixel value patterns 40 and 44 satisfy the first condition, the pixel value patterns 41a, 41b, 42a, 42d, 43a and 43b satisfy the second condition, the pixel value patterns 41c, 41d, 42c, 42e, 42f, 43c and 43d have the possibility of satisfying the third condition, and the pixel value patterns 42b and 42e satisfy the fourth condition.

If a binarized pixel value pattern of the currently selected reduction target area falls under the pixel value pattern 41c, 41d, 42c, 42e, 42f, 43c or 43d, then on the basis of binarized pixel values of adjacent pixels it is determined whether or not the third condition is satisfied on the currently selected reduction target area. Here it may be applicable that the fourth condition is automatically satisfied when the third condition is not satisfied.

(d) In a case that the reduction target area consists of five pixels

Figure 6:
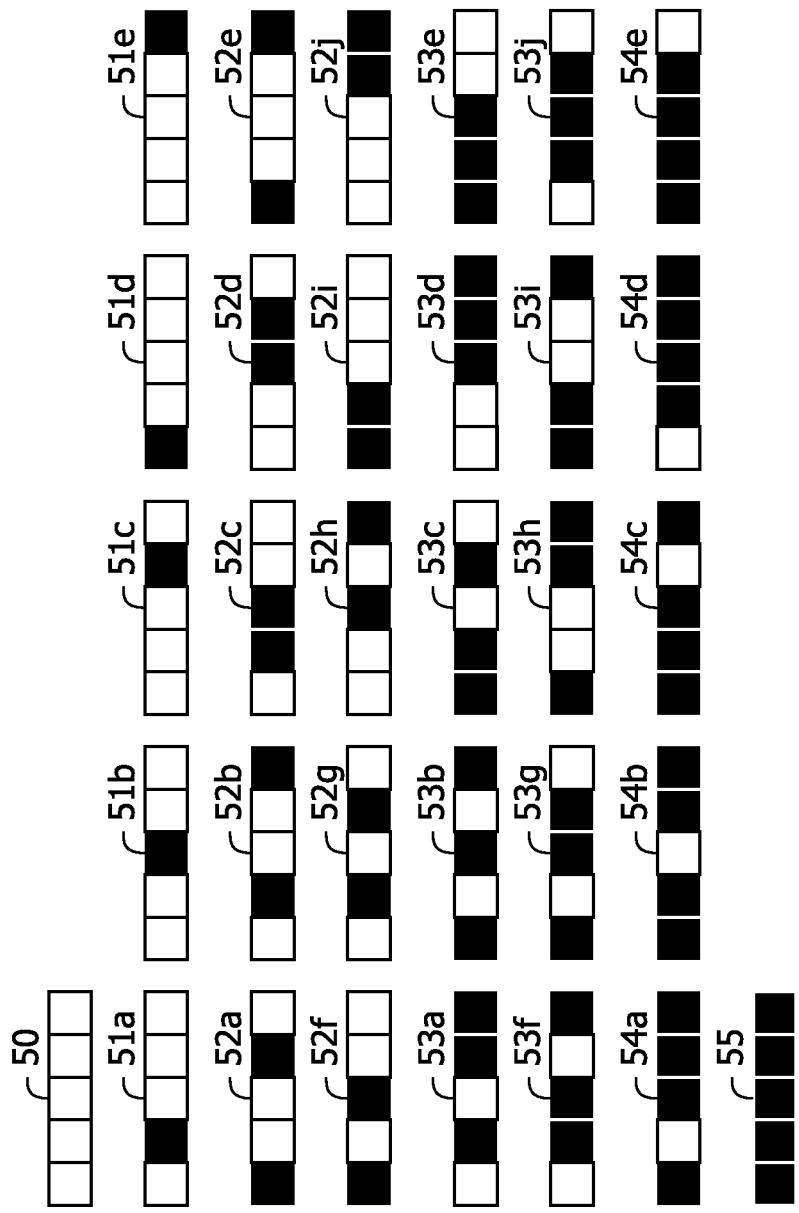
FIG. 6 shows a diagram which indicates patterns of binarized pixel values in a case that a reduction target area consists of five pixels.

FIG. 6 shows a diagram which indicates patterns of binarized pixel values in a case that a reduction target area consists of five pixels.

If the reduction target area consists of five pixels, a binarized pixel value pattern of the reduction target area falls under any one of pixel value patterns 50, 51a to 51e, 52a to 52j, 53a to 53j, 54a to 54e and 55 shown in FIG. 6.

Among them, the pixel value patterns 50 and 55 satisfy the first condition, the pixel value patterns 51a to 51c, 52a, 52b, 52f to 52h, 53a to 53c, 53f, 53g and 54a to 54c satisfy the second condition, the pixel value patterns 51d, 51e, 52c to 52e, 53h to 53j, 54d and 54e have the possibility of satisfying the third condition, and the pixel value patterns 52i, 52j, 53d and 53e satisfy the fourth condition.

If a binarized pixel value pattern of the currently selected reduction target area falls under the pixel value pattern 51d, 51e, 52c to 52e, 53h to 53j, 54d and 54e, then on the basis of binarized pixel values of adjacent pixels it is determined whether or not the third condition is satisfied on the currently selected reduction target area. Here it may be applicable that the fourth condition is automatically satisfied when the third condition is not satisfied.

(e) In a case that the reduction target area consists of six pixels

Figure 7:
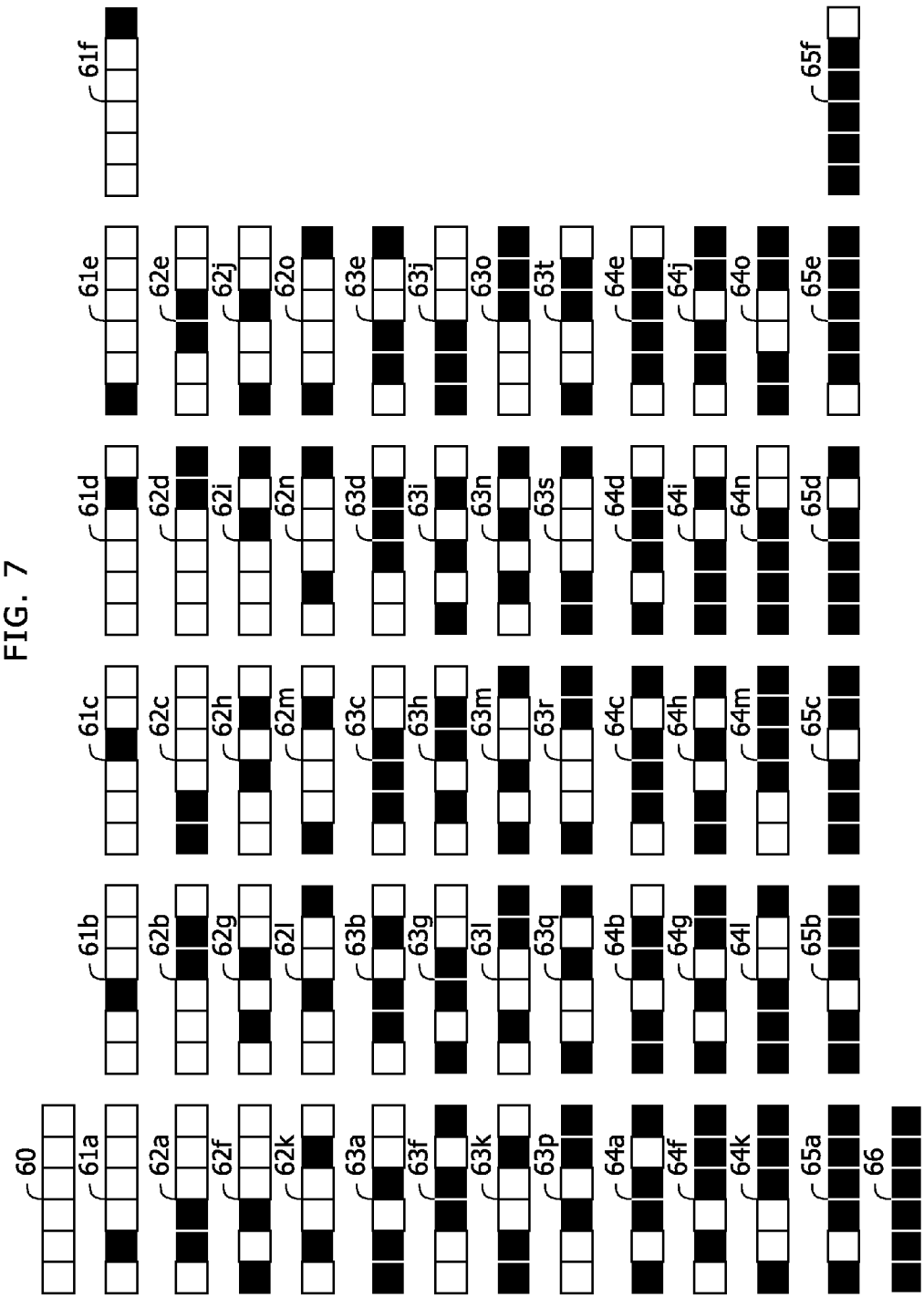
FIG. 7 shows a diagram which indicates patterns of binarized pixel values in a case that a reduction target area consists of six pixels.

FIG. 7 shows a diagram which indicates patterns of binarized pixel values in a case that a reduction target area consists of six pixels.

If the reduction target area consists of six pixels, a binarized pixel value pattern of the reduction target area falls under any one of pixel value patterns 60, 61a to 61f, 62a to 62o, 63a to 63t, 64a to 64o, 65a to 65f and 66 shown in FIG. 7.

Among them, the pixel value patterns 60 and 66 satisfy the first condition, the pixel value patterns 61a to 61d, 62f to 62n, 63a, 63b, 63f to 63i, 63k to 63n, 63p, 63q, 64a to 64d, 64f to 64j and 65a to 65d satisfy the second condition, the pixel value patterns 61e, 61f, 62a, 62b, 62o, 63c to 63e, 63r to 63t, 64e, 64k, 64l, 65e and 65f have the possibility of satisfying the third condition, and the pixel value patterns 62c to 62e, 63j, 63o and 64m to 64o satisfy the fourth condition.

If a binarized pixel value pattern of the currently selected reduction target area falls under the pixel value pattern 61e, 61f, 62a, 62b, 62o, 63c to 63e, 63r to 63t, 64e, 64k, 64l, 65e and 65f, then on the basis of binarized pixel values of adjacent pixels it is determined whether or not the third condition is satisfied on the currently selected reduction target area. Here it may be applicable that the fourth condition is automatically satisfied when the third condition is not satisfied.

In the aforementioned embodiment, the image reducing unit 3 performs a reduction process with a reduction ratio in one of a primary scanning direction and a secondary scanning direction of an image for each reduction target area including a predetermined number of pixels, and subsequently performs a reduction process with a reduction ratio in the other of the primary scanning direction and the secondary scanning direction of the image for each reduction target area including a predetermined number of pixels.

The binarizing unit 4 binarizes pixel values of the pixels included in the reduction target area in the reduction process, and the characteristic value identifying unit 5 identifies a characteristic value on the basis of a pattern of the binarized pixel values in the reduction target area, and integrates the characteristic value. The control unit 6 terminates the reduction process of the image performed by the image reducing unit 3, changes the reduction ratio so as to increase a size of a reduced image (e.g. increase it by a predetermined rate), and causes the image reducing unit 3 to perform the reduction process with the changed reduction ratio again when the integrated value of the characteristic value exceeds a predetermined threshold value before the image reduction unit 3 finishes the reduction processes in the primary scanning direction and the secondary scanning direction of the image.

Therefore, when an image which includes a relatively complex graphic such as a character, an adequate reduction ratio without spoiling the readability of the graphic is determined automatically and fast for the reduction process.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:

an image reducing unit configured to perform a reduction process with a reduction ratio in one of a primary scanning direction and a secondary scanning direction of an image for each reduction target area, and subsequently perform a reduction process with a reduction ratio in the other of the primary scanning direction and the secondary scanning direction of the image for each reduction target area said primary scanning direction and said secondary scanning direction being substantially in the vertical and horizontal direction respectively;

a binarizing unit configured to binarize pixel values of the pixels included in the reduction target area in the reduction process;

a characteristic value identifying unit configured to identify a characteristic value on the basis of a pattern of the binarized pixel values in the reduction target area by classifying the pattern based on at least three predetermined conditions with a different characteristic value for each predetermined condition, and integrate the characteristic value by summing up the characteristic values; and a control unit configured to terminate the reduction process of the image performed by the image reducing unit, change the reduction ratio so as to increase a size of a reduced image, and cause the image reducing unit to perform the reduction process with the changed reduction ratio again when the integrated value of the characteristic value exceeds a predetermined threshold value before the image reduction unit finishes the reduction processes in the primary scanning direction and the secondary scanning direction of the image.

2. The image processing apparatus according to claim 1, wherein:

the characteristic value identifying unit is further configured to classify the patterns of the binarized pixel values in the reduction target area using the at least three predetermined conditions and use as the characteristic value one of values corresponding to the at least three conditions;

the at least three conditions includes a first condition, a second condition, and a third condition;

the first condition is that the number of pixels which have the binarized pixel values of 1 is zero or the number of pixels which has the binarized pixel values of 0 is zero;

the second condition is that at least one pixel which has the binarized pixel value of 1 is isolated or at least one pixel which has the binarized pixel value of 0 is isolated; and the third condition is that a binarized value of a left end pixel in the reduction target area is different from binarized values of adjacent pixels on both sides of the left end pixel or a binarized value of a right end pixel in the reduction target area is different from binarized values of adjacent pixels on both sides of the right end pixel.

3. The image processing apparatus according to claim 2, wherein:

the value corresponding to the second condition is either equal to or larger than the value corresponding to the third condition; and the value corresponding to the third condition is either equal to or larger than the value corresponding to the first condition.

4. The image processing apparatus according to claim 3, wherein the values corresponding to the second and the third conditions are larger than the value corresponding to the first condition.

5. An image processing apparatus method comprising the steps of:

performing a reduction process with a reduction ratio in one of a primary scanning direction and a secondary scanning direction of an image for each reduction target area, and subsequently performing a reduction process with a reduction ratio in the other of the primary scanning direction and the secondary scanning direction of the image for each reduction target area, said primary scanning direction and said secondary scanning direction being substantially in the vertical and horizontal direction respectively;

binarizing pixel values of the pixels included in the reduction target area in the reduction process;

identifying a characteristic value on the basis of a pattern of the binarized pixel values in the reduction target area by classifying the pattern based on at least three predetermined conditions with a different characteristic value for each predetermined condition, and integrate the characteristic value by summing up the characteristic values; and terminating the reduction process of the image, changing the reduction ratio so as to increase a size of a reduced image, and performing the reduction process with the changed reduction ratio again when the integrated value of the characteristic value exceeds a predetermined threshold value before the reduction processes in the primary scanning direction and the secondary scanning direction of the image are finished.

6. A non-transitory computer readable recording medium storing an image processing program, wherein the image processing program causes a computer to act as:

an image reducing unit configured to perform a reduction process with a reduction ratio in one of a primary scanning direction and a secondary scanning direction of an image for each reduction target area, and subsequently perform a reduction process with a reduction ratio in the other of the primary scanning direction and the secondary scanning direction of the image for each reduction target area, said primary scanning direction and said secondary scanning direction being substantially in the vertical and horizontal direction respectively;

a binarizing unit configured to binarize pixel values of the pixels included in the reduction target area in the reduction process;

a characteristic value identifying unit configured to identify a characteristic value on the basis of a pattern of the binarized pixel values in the reduction target area by classifying the pattern based on at least three predetermined conditions with a different characteristic value for each of the predetermined conditions, and integrate the characteristic value by summing up the characteristic values; and a control unit configured to terminate the reduction process of the image performed by the image reducing unit, change the reduction ratio so as to increase a size of a reduced image, and cause the image reducing unit to perform the reduction process with the changed reduction ratio again when the integrated value of the characteristic value exceeds a predetermined threshold value before the image reduction unit finishes the reduction processes in the primary scanning direction and the secondary scanning direction of the image.

* * * * *